Patented Mar. 18, 1930

1,750,768

UNITED STATES PATENT OFFICE

LOUIS ARONSON AND ALBERT FELDBLET, OF BROOKLYN, NEW YORK

FLAVORING TEA

No Drawing.   Application filed December 31, 1927.   Serial No. 244,040.

Our invention relates to an improved method of preparing the well known beverage product known as tea and is applicable to any of the well known teas on the market; Ceylon, China and Formosa teas, etc.

A particular object of the invention is the improvement of the flavor of tea so that the tea in question will make a potable and pleasant beverage without the addition of any ingredients except sugar.

Another object of the invention is the preparation of a tea having a new and novel flavoring.

We prepare our improved tea as follows:—

To one part of chemically pure citric acid is added two parts of water to dissolve same and then one part of alcohol. Four parts of dried tea are then macerated in four parts of this solution for about eight hours and after the tea has thoroughly absorbed this solution, it is slowly dried for a period of two hours at a temperature not exceeding 50° C. The dried tea is then mixed with an equal weight of ordinary untreated tea.

We then prepare a solution of one part of oil of lemon in ten parts of ethyl alcohol and place the mixture of treated and untreated tea in a vessel, the bottom of which consists of a wire gauze. The vessel containing the tea is then subjected to the vapors of the alcoholic solution of oil of lemon for a period of about ¼ hour, so that the alcoholic vapors of oil of lemon will thoroughly permeate all of the tea.

If lemon juice is mixed with tea leaves, the tea leaves do not remain stable but become mouldy in a short time. However, by subjecting the tea leaves to the vapor of oil of lemon, a very small quantity is absorbed by the tea leaves, just enough to give them the desired pleasant lemon odor. The addition of this small quantity of the vapor of the oil permits the tea leaves to remain stable.

The treatment of the tea is then complete but requires a certain amount of slow drying in order to get rid of the residual alcohol.

For oil of lemon may be substituted other essential oils or extracts which are soluble and which have a pleasant flavor such as pineapple flavoring materials, orange flavoring materials, orange oil, etc., it being understood that either natural or synthetic oils, ethers or extracts may be used for this purpose and may be substituted for the oil of lemon above mentioned. In this way we produce a product which on the addition of hot water, gives a lemon flavored tea having a pleasant aroma and which requires only the addition of sugar to make a potable and satisfactory beverage.

We find that the operation of subjecting the treated tea to the alcoholic solution of oil of lemon is complete after a treatment of about 15 minutes. The amount of oil of lemon absorbed is less than 1/20th of 1% by weight of the tea.

We claim:

1. A process of treating tea by impregnating same with a small proportion of a solution of citric acid and then subjecting the dry tea to the vapors of a solution of essential oil of lemon in alcohol.

2. A process of treating tea by impregnating same with a small proportion of a solution of citric acid and then subjecting the tea to the vapors of a solution of essential oil of one of the citrus fruits dissolved in ethyl alcohol.

3. A process of treating tea by impregnating same with a small proportion of a solution of citric acid and then subjecting the tea to the vapors of a solution of essential oil dissolved in ethyl alcohol.

In testimony whereof we affix our signatures.

LOUIS ARONSON.
ALBERT FELDBLET.